United States Patent [19]
Bull

[11] 3,838,272
[45] Sept. 24, 1974

[54] BRAKING CONDITION INDICATOR FOR RAPID TRANSIT TRAINS

[75] Inventor: Ivor H. Bull, London, England

[73] Assignee: Westinghouse Brake & Signal Co., Ltd., Chippenham, Wiltshire, England

[22] Filed: Nov. 14, 1973

[21] Appl. No.: 415,613

[30] Foreign Application Priority Data
Nov. 17, 1972 Great Britain .................... 53163/72

[52] U.S. Cl. ........ 246/169 R, 246/167 R, 340/52 B
[51] Int. Cl. ............................................. B61l 3/10
[58] Field of Search ............ 246/191, 167 R, 169 A; 105/61 R; 340/52 B, 69, 47

[56] References Cited
UNITED STATES PATENTS

| | | | |
|---|---|---|---|
| 2,408,660 | 10/1946 | Lannge | 246/169 A |
| 2,802,935 | 8/1957 | Swander | 246/167 R |
| 2,961,640 | 11/1960 | Von Behren | 246/167 R |
| 3,117,301 | 1/1964 | Halsted | 246/169 A |
| 3,560,054 | 2/1971 | Sarbach | 105/61 |
| 3,696,758 | 10/1972 | Godinez | 105/61 |

*Primary Examiner*—M. Henson Wood, Jr.
*Assistant Examiner*—Reinhard J. Eisenzopf
*Attorney, Agent, or Firm*—R. W. McIntire, Jr.; A. G. Williamson, Jr.

[57] ABSTRACT

A signal is transmitted from the lead car control position, when activated, through a train line channel completed over circuit connectors within the automatic couplers between cars and over contacts closed when other car control positions are inactive. This signal is returned by loop connectors in the rear coupler over one of two other train line channels, each including between car coupler circuit connectors and controlled on each car by a brake condition detector which completes one or the other circuit only when that car brakes are released (OFF) or applied (ON), respectively. OFF and ON registry relays on each car respond to a received signal to control indicators at the associated control locations which, at the lead position, display corresponding brake condition indications to guide the train operator. Brake assurance registry apparatus on the lead car, associated with an ATO system, also receives the brakes ON indication for registry as a brake assurance signal for the speed control apparatus.

9 Claims, 2 Drawing Figures

BRAKING CONDITION INDICATOR FOR RAPID TRANSIT TRAINS

My invention pertains to braking condition indication apparatus for rapid transit trains. More particularly, this invention pertains to a train-carried arrangement for determining, for the train operator or for automatic train operation apparatus, the condition of the brakes on each car of a rapid transit train.

In the operation of multiple unit trains, for example, a rapid transit train, it is desirable that the operator know the response of the brake apparatus on each car to the brake operations initiated from the train control position. This includes the response both to the application of the train brakes and to the subsequent release of the brakes in order to continue forward movement. Such indications assist the operator in knowing or recognizing when additional action is required on his part, for example, a heavier brake application in case not all of the train brakes respond. If automatic train operation (ATO) is in service, the braking condition indications are provided to the master train control apparatus, particularly when a brake application is initiated. Such a brake assurance indication for the automatic control apparatus is quite necessary since a failure of the train brakes to fully respond to a noraml brake application may require an emergency application in order to insure that the train stops within the available distance or within the alloted time. Such brake assurance systems are usually made an integral part of ATO apparatus and frequently are mechanical in nature. Thus an arrangement using the train line conductors, with an electrical check on each car reported to the train operation control position, is quite desirable. Such an indication to the operator or for the ATO apparatus, that is, under either manual or automatic controls, provides a better, more efficient, and more economical operation for rapid transit trains.

Accordingly, an object of my invention is a function condition indication arrangement for multiple unit trains.

Another object of the invention is a brake condition indicator at the operator's position on rapid transit trains controlled in accordance with existing braking conditions on each car.

Still another object of the invention is a brake assurance indication arrangement for an automatic train operation system on rapid transit trains.

A further object of my invention is a braking condition indication arrangement for checking the brake condition on each car of a rapid transit train, using a check signal transmitted over train line conductors from the operating position to the rear of the train and returned through various brake condition check devices.

Still another object of the invention is an indication checking arrangement providing an indication at the selected operator's position on a multiple unit train of the condition of the brakes on the entire train.

It is also an object of my invention to provide an arrangement for checking the execution of a desired braking condition on each car of a train and for registering an indication of the desired condition at the control position for the train only when such condition exists on each car.

A still further object of my invention is brake assurance apparatus for a rapid transit system which checks and registers that the desired braking condition is effective on each car of the train.

Also an object of my invention is a braking condition indication arrangement, using train line conductors, braking detectors and register relays on each car, and signaling power from the lead car control position, to register that a similar braking or nonbraking condition exists on each car of a rapid transit train.

Other objects, features, and advantages of my invention will become apparent from the following specification when taken in connection with the accompanying drawings and appended claims.

In practicing my invention, signals are transmitted from and to the leading car operating position over dedicated train line conductors through various circuit switches, such as, for example, relay contacts and circuit controllers, in order to check the interrogated function. Specifically, energy is transmitted from the operator's position on the lead car of the train over a train line circuit completed through relay contacts closed at nonselected operating positions on other cars and through circuit controllers in the automatic couplers. This signaling energy is then returned from the rear end of the train over loop circuit paths completed in the non-actuated automatic coupler of the rear car. The return circuit path through the train line includes a detector device on each car which responds to the condition of the function being checked, specifically, the brakes on that car. Only if all cars are in the desired braking condition is the signal received in the control position on the leading car. A register relay is provided on each car for each condition of the brake apparatus, that is, released and applied. Under either braking condition, the operated relay actuates a display indicator. On the lead car, the actuated indicator displays for the operator, or registers for the automatic train operation apparatus, that the condition desired has been attained on each car of the train. The corresponding relays and indicators are actuated on the following cars also but at such locations are effective only to indicate where a failure condition may exist. A brake assurance control apparatus may slso be actuated at the lead or control position of the train by the received brakes applied signal. Such actuation of the brake assurance controller permits the ATO apparatus to function in the normal manner. However, this indication is effective only for such apparatus at the leading position of the train which is controlling train movement.

Prior to defining my invention in the appended claims, I shall describe in detail the particular embodiment of the apparatus of my invention illustrated in the accompanying drawings in which:

In each of the drawings, similar reference characters refer to similar parts of the apparatus.

Figure 1:
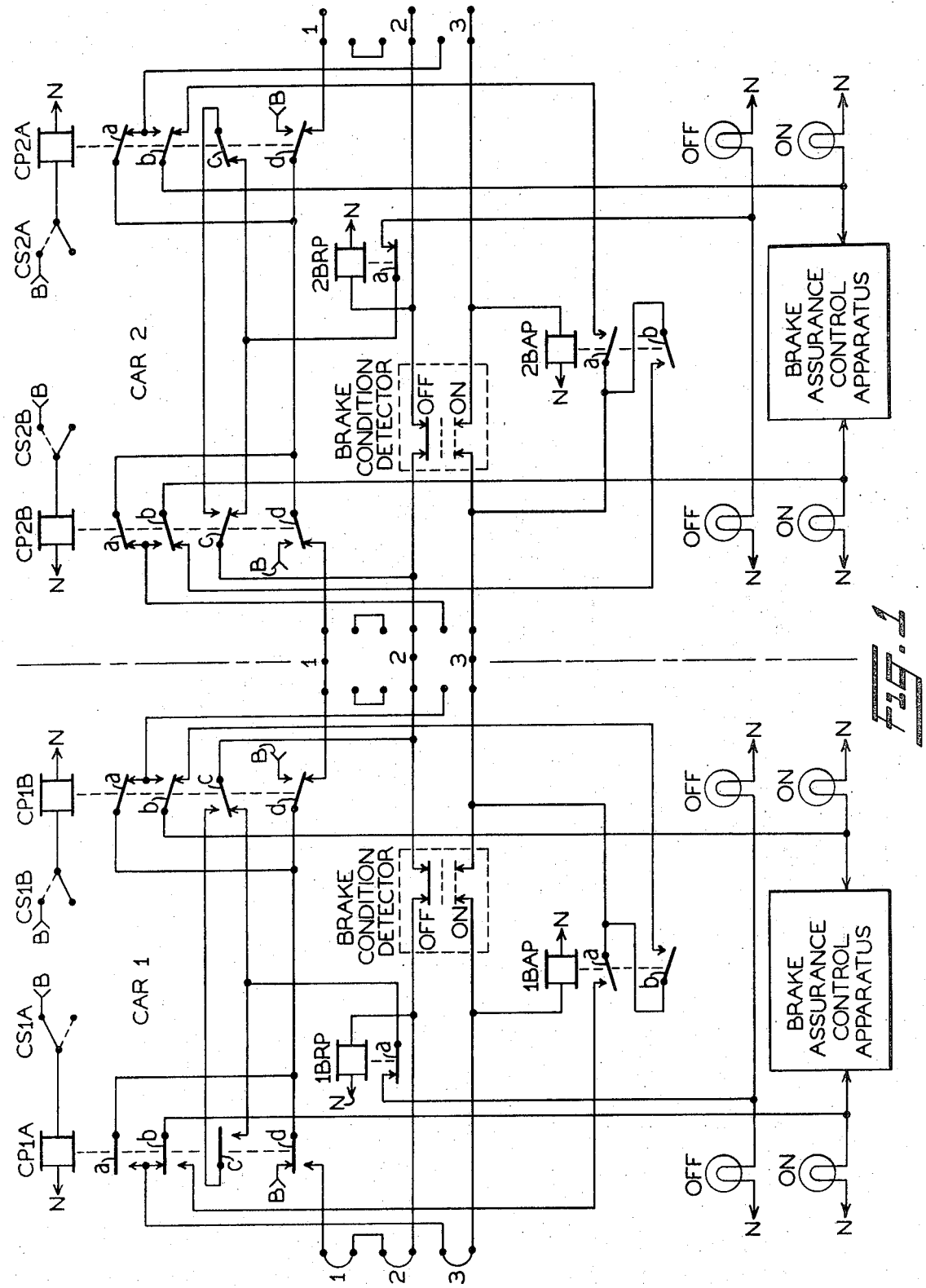
FIG. 1 is a schematic circuit diagram of the brake condition indication arrangement on two cars of a multiple unit train, such arrangment embodying my invention.
Figure 2:
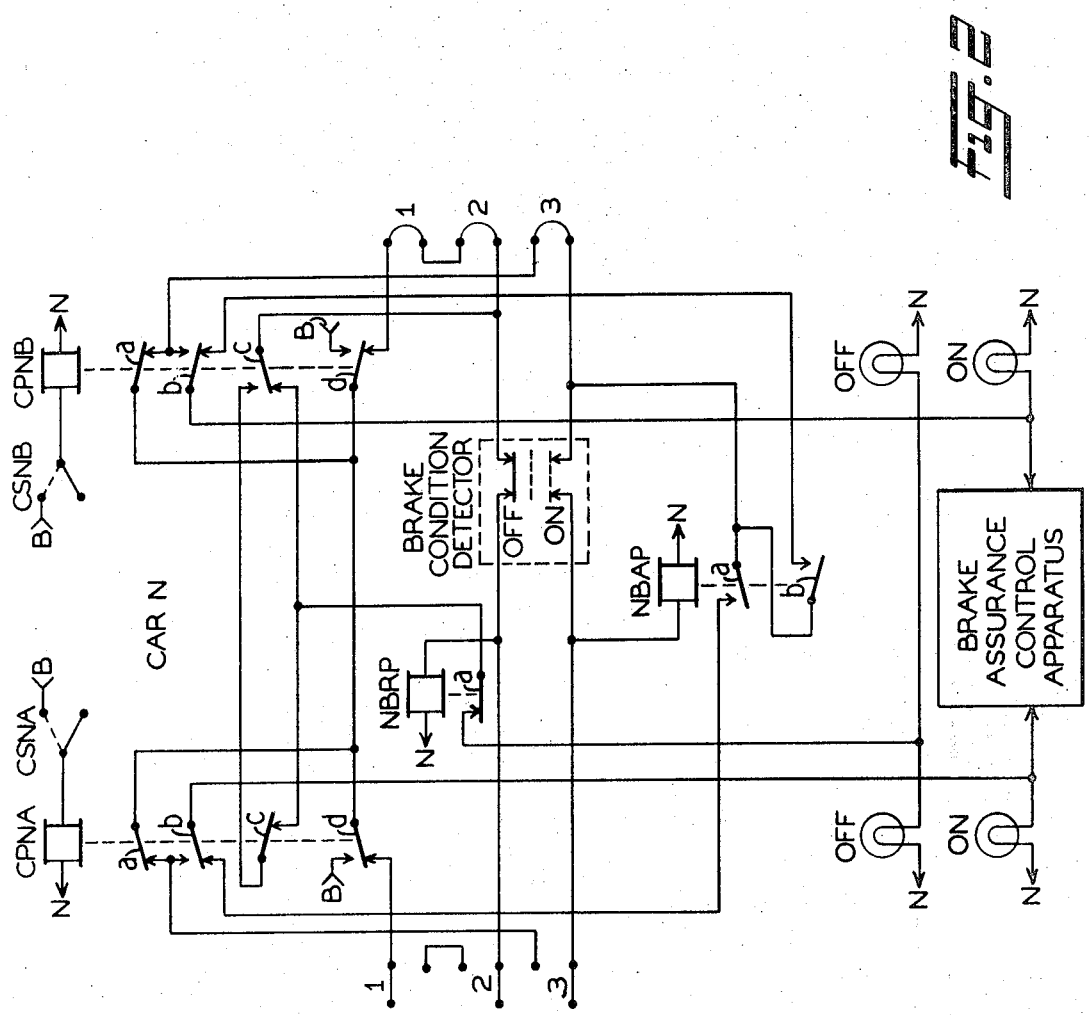
FIG. 2 is a similar illustration of the apparatus on the final car of a train which cooperates with the apparatus shown in FIG. 1.

Referring now to FIG. 1, the apparatus embodying the invention is illustrated as carried on car 1 and car 2 of a train, shown respectively to the left and right of a vertical dot-dash line in the center of this figure. In the center of the drawing, immediately adjacent to the dot-dash line, are two columns of six terminals each with a third or center column showing three terminals in line with the dot-dash divider. These terminals represent the train line connection through the automatic coupler between car 1 and car 2. Three train line circuit connectors 1, 2, and 3 complete the circuits between the cars when the car coupling is completed. These circuit connections are completed in an automatic manner when the two couplers are joined. Such automatic couplers with automatic circuit connectors are known in the art and have been previously used. It is to be noted that the second and third terminals from the top on each car coupler are permanently connected on each car. At the left end of car 1, that is, the far left of the drawing, a similar set of six coupler terminals is illustrated. Loop circuit connections are shown which are automatically completed when the coupler is not actuated, that is, when it is not joined with another coupler because it is at the end of the train. In other words, the loop connections 1, 2, and 3 at the lead end of car 1 are automatically completed between the illustrated terminals of the car coupler when it is withdrawn from the coupler of an adjacent car. At the right of car 2, the coupler is shown in the condition existing where it is coupled to a following car such as car N shown in FIG. 2. The circuit connections occurring when these two cars are coupled may be seen by placing FIG. 2 of the drawings immediately to the right of FIG. 1 with the corresponding terminals in the car couplers matched to show the completed circuits 1, 2, and 3. The apparatus in FIG. 2 then represents that on the last car of the train. Although other cars may be inserted in the train between car 2 and car N, the illustration of three cars is sufficient to complete the showing and understanding of the apparatus embodying my invention and for simplicity no other cars are illustrated. It is to be further noted that, on the right coupler of car N, which then becomes the coupler on the rear end of the train, similar loop connections 1, 2, and 3 are automatically completed since this coupler is not actuated, that is, not joined to another car.

Each end of each car on the train is provided with a control selection switch CS which is operated to its upper position when that end of the car is at the head end of the train and is to be the control operator's position or the ATO command location. As illustrated in the drawings, only switch CS1A at the left end of car 1 is so operated. Therefore, the train is controlled from this left end position of car 1 and thus moves forward to the left. Each such control selection switch is repeated by a control repeater relay CP which is energized only when that car end is the control position. Thus control repeater relay CP1A at the left position on car 1 is energized, and its contacts are picked up, over an obvious circuit completed when switch CS1A is operated to its upper or control selection position. It will be noted that, on car 2, the apparatus locations are reversed in order. In other words, on this car 2, the designated B end is towards the front of the train in order to illustrate that the cars may be positioned with either end in the leading direction towards which the train moves. As will become apparent later, even the opposite or B end of car 1 could serve as the head end of the train if so positioned in making up the coupled train and the apparatus embodying my invention will still serve in the proper fashion as the brake condition indicator.

Each car on the train is provided with a source of direct current energy which serves for energizing various control devices and, as specifically shown here, for transmitting the signals required to check the condition of the brakes. However, the provision of such energy sources is well known and any one of several types may be used. Therefore each separate car source is not specifically illustrated in the drawings but connections to the positive and negative terminals of each source are designated by the reference characters B and N, respectively. The negative terminal N of each car source is connected to a common ground bus through the train line. Although this train line connection is not specifically shown, such are well known and understood by those familiar with the art. Each car is further provided with a brake release repeater relay BRP and with a brake application repeater relay BAP. The control of such relays on each car will be discussed later. Each car is also provided with a brake condition detector device which repeats the condition of the brake apparatus on that train. These are shown within the dash block near the center of each car apparatus by a circuit controller. The circuit connector bar of each device is shown in its upper, brake OFF position, as illustrated by the solid line in the drawing, with a lower, brake ON position illustrated by a dash line. A circuit path through the detector device is completed by the connector when the device occupies either its full OFF or full ON position. In case the brakes are neither released nor fully applied, the circuit controller can occupy an intermediate position, shown in the center also by a dash line, in which no circuit connections are completed. Each car is also provided at each end with two indicators, illustrated as lights, one for the brakes released or OFF condition and the other for the brakes applied or ON condition. A conventional block illustrates the brake assurance control apparatus which would be used in connection with an ATO system, as will be discussed later.

I shall now describe the operation of the system embodying my invention as it pertains to the complete train. It is assumed that the train is made up with cars 1 and 2 of FIG. 1 and a final car N illustrated by placing FIG. 2, as previously indicated, immediately adjacent at the right of FIG. 1. It is further assumed that all car brakes are in their released or OFF condition with the apparatus in the drawings illustrated in such condition. The left end of car 1 has been selected as the operator's control position for the train. Thus lever or switch CS1A is in its upper position as illustrated and relay CP1A is energized. All other control switches are in their lower position, as illustrated, with the associated repeater relays released. This condition must actually exist before the train can be controlled from the lead position selected by the operator.

A completed circuit thus exists in the train line for transmitting a signal from the lead or selected control position to the rear of the train for checking the brake condition. This circuit extends from terminal B of the source on car 1 over front contact d of relay CP1A, back contact d of relay CP1B, circuit connector 1 in the couplers between car 1 and car 2, back contacts d, in series, of relays CP2B and CP2A on car 2, circuit connector 1 in the couplers between cars 2 and N, and back contacts d, in series, of relays CPNA and CPNB on car N to the loop connector 1 in the rear coupler of car N. On car N, a branch path in multiple with back contact d of relay CPNB exists over back contact a of this same relay to loop connector 3 on the rear coupler. It will be noted, however, that this branch path is interrupted beyond loop connector 3 at the open ON contacts of the brake condition detector of car N, which is in its OFF indication position, and at front contacts a and b of relay NBAP. The circuit for the OFF brake indication may be traced further from loop connector 1 of the rear coupler over the permanent connection between the second and third terminals of the coupler, loop connector 2, the OFF contacts of the brake condition detector, now closed, i.e., bridged by the circuit controller, circuit connector 2 in the couplers between car N and car 2, brake condition detector OFF contacts in car 2, circuit connector 2 in the couplers between car 2 and car 1, the closed OFF position contacts in the brake condition detector in car 1, and through the winding of relay 1BRP to terminal N of the local source. It will be noted that, on each car, a branch connection of the just traced circuit exists through the winding of the corresponding relays NBRP and 2BRP to terminal N of the source, so that each of these brake release repeater relays is also energized.

With relay 1BRP thus picked up, a circuit may be traced from the circuit connector 2 at the rear coupler of car 1 over back contact c of relay CP1B and front contact a of relay 1BRP through the filaments, in multiple, of both OFF indicator lights on car 1 to terminal N. Thus the OFF light at the operator's position at the lead end of the train is illuminated to indicate to the operator that the brakes on all cars are in the released condition which he desires for train movement. If the first car of the train should be positioned with its B end leading or in the control location, the circuit for the OFF lights, rather than back contact c of relay CP1B, includes front contact c of relay CP1B and back contact c of relay CP1A. If the light at the operator's position is not illuminated, it indicates that some fault condition exists, that is, the brakes on at least one of the cars are not fully released. This fault may be located by checking the condition of the OFF lights on each car of the train. It is to be noted that, on each car, a similar circuit for the OFF lights exists from the train line conductor, in the circuit previously traced, over back contact b of the B end control repeater relay CP and front contact a of the corresponding BRP relay to the common connection to the OFF lights and thence to terminal N. Considering the circuit for relays BRP previously traced, it will be noted that if a brake condition detector on any car is not in its full OFF position, either the BRP relay on that car is not energized or the circuit is not completed for energizing the corresponding OFF lights. Thus checking for the lack of illumination of the OFF lights is a means of tracing the fault location in releasing the brakes on the train.

It is now assumed that, as the train is moving, the operator makes a brake application in order to bring the train to a halt. When the application on each car is fully effective, the brake condition detector circuit controller moves to its ON position, closing the circuit through the corresponding contacts. The interruption of the circuit through the OFF contacts of the brake condition detector on car N obviously interrupts the circuit network for energizing all of hte BRP relays, which thus release to extinguish the indications displayed by the OFF lights. However, the positive energy signal already appearing at the loop connector 3 of the rear coupler of car N is now returned to the lead car over a circuit extending over the ON position contacts of the brake condition detector on car N, circuit connector 3 in the coupler between cars N and 2, the ON position contacts of the brake condition detector of car 2, circuit connector 3 in the coupler between cars 2 and 1, the circuit through the ON contacts of the brake condition detector on car 1, and thence through the winding of relay 1BAP to terminal N. Since the winding of each other BAP relay has a branch connection from the circuit just traced, these relays, that is, relays 2BAP and NBAP, are also energized and pick up. The circuit also branches from the winding of relay 1BAP over loop connector 3 on the front coupler of car 1 and front contact b of relay CP1A through the filament of the ON light at the lead control position to terminal N. The ON indicator light at the control position is thus energized and provides the operator with an indication that the brakes on all cars have been applied. This signal may also be applied, if an ATO system is in operation, to a brake assurance control apparatus on the lead car to indicate to the automatic control arrangement that brakes have been applied in the normal fashion and that no reason exists for a heavier or an emergency application of the brakes in order to counteract a braking failure on any car. It will be noted that under such ATO operation, only the control apparatus on the lead car would be effective and only the signal applied over the circuit branching from the ON indicator light at the lead position would be effective to provide a brake assurance control registry. Although using a different type of signal source, an example of the use of a brake assurance indication means in a train speed control system is disclosed in the copending U.S. Pat. application Ser. No. 256,888, filed May 25, 1972, now U.S. Pat. No. 3,794,833 by F. V. Blazek et al. for a Train Speed Control System. The other ON lights on the various cars are also energized at this time. For example, a circuit path exists over front contact b of relay 1BAP and back contact b of relay CP1B to apply the signal energy to the filament of the ON light in the rear position on car 1, which is thus illuminated to indicate the brake application. On each of the other cars, multiple branch paths are completed, from the train line conductors over front contacts a and b of the BAP relay on that car and back contacts d of each of the control repeater relays, to supply energy to each of the ON indicator lights. On these other cars, the brake assurance control apparatus is inactive since, under ATO, only the apparatus on one car can control the operation of the train and thus any signal supplied to such apparatus on the other cars is ineffective. If the ON light at the operator's position is not illuminated, it is possible once again to trace the location of the fault by observing the position where the ON indicator light has not been illuminated. For example, if the brake application is not effective on car 2, the brake condition detector on that car would not be in its full ON position and, although relay 2BAP would be energized by the signal received from the rear, no energy would be supplied over its front contacts a and b to the corresponding ON indicator lights. Thus an indication is available that the brakes on this car have not been applied as desired by the operator. If the fault occurred on the last car, the interruption of the circuit by the brake condition detector ON contacts would result in no energy applied to the winding of relay NBAP and thus no circuit could be completed for the on lights over its front contacts.

The apparatus of my invention thus provides a simple means for checking the braking condition on each car of a rapid transit train. An indication is provided to the operator that the desired braking condition is in effect or if not in effect, a simple checking action will determine where the failure exists. The arrangement uses the train line conductors already provided from car to car to transmit the check signals and only two relays on each car register the return signal from the rear end of the train. Each car may be positioned with either end towards the head of the train and still provide a safe and proper operation of the checking system. Various type indicators or alarms may be used to provide the indication to the operator, each controlled by the register relays on the corresponding car. The arrangement also supplies a brake application assurance signal to an ATO system if in use to allow the proper automatic control of the train under such arrangements. All of these features are accomplished in a safe, simple, and economical manner by the arrangement embodying my invention.

Although I have herein shown and described but a single form of apparatus embodying the braking condition indication arrangement of my invention, it is to be understood that various modifications and changes therein within the scope of the appended claims may be made without departing from the spirit and scope of my invention.

Having now described the invention what I claim as new and desire to secure by Letters Patent, is:

1. Brake condition indication apparatus, for a rapid transit train consisting of a plurality of coupled cars and having at least a minimum form of train control apparatus, comprising in combination,
   a. a first, a second, and a third signaling channel each extending the length of the train, said first channel cross connected to said second and third channels at the rear of the train,
   b. a braking condition detector means on each car controlled by the associated car brake apparatus for operating to at least a first and a second position to detect at least the associated car brakes released and applied, respectively,
   c. each detector means coupled for completing said second or said third channel on that car as that detector means is operated to its first or second position, respectively,
   d. a signal source connected to said first channel at a selected control location for the train for transmitting a detection signal to the rear of that train for retransmission over said second and third channels when complete, and
   e. braking condition registry means at said selected control location coupled for receiving said detection signal from said second and third channels whichever complete and responsive to the received signal for registering a brake condition indication for control of that train.

2. Indication apparatus as defined in claim 1 in which,
   said registry means comprises two indicator means, one coupled to each of said second and third channels and separately actuated for displaying an indication of all the train brakes released or applied, as a signal is received over said second or said third channel, respectively.

3. Indication apparatus as defined in claim 1 in which,
   a. said train control apparatus is of the automatic train operation type, and
   b. said registry means includes control apparatus connected for receiving a signal over said third channel and coupled to said train control apparatus for initiating a heavier brake application if a brakes applied signal is not received after a train braking application has been initiated.

4. Indication apparatus as defined in claim 1 in which,
   a. said channels are completed between adjacent cars by circuit connectors automatically closed when the cars are coupled together,
   b. the connections from said first channel to said second and third channels are completed by loop circuit connectors automatically closed when the rear coupler remains uncoupled, and which further includes,
   c. control selector means associated with each end of each car, normally occupying a first position and operable to a second position for selecting the associated car end as the control location for the train,
   d. said first channel also including first position contacts of the control selector means at each non-selected location,
   e. said signal source at said selected control location connected to said first channel by a second position contact of the associated selector means.

5. Indication apparatus as defined in claim 4 in which each car of a train includes braking condition registry means comprising in combination,
   a. a first and a second registry relay connected, respectively, to said second and third channels for responding to a signal received over the associated channel, and
   b. a first and a second indicator means associated with each control selector means,
      1. each first indicator means controlled by the corresponding car first registry relay for displaying a brake released indication when a signal is received over said second channel,
      2. each second indicator means, except that associated with the selected control location, controlled by the corresponding car second registry relay for displaying a brake applied indication when a signal is received over said third channel,
   c. the second indicator means associated with the selected control location connected to said third channel by the corresponding control selector means for displaying a brake applied indication when a signal is transmitted over said third channel.

6. A braking condition registry arrangement for a rapid transit train consisting of a plurality of coupled cars, comprising in combination,
   a. a braking condition detector means on each car coupled for registering at least the OFF and ON conditions of the associated car brakes by operating to a first and a second position, respectively,
   b. first and second signal circuit paths extending through coupled train line conductors from rear to front of the train and including first and second position contacts, respectively, of the detector means on each car to complete the first or second circuit path on a particular car when the corresponding car brakes are off or on, respectively, c. a control position selector means for each end of each car, each selectively operable for establishing the corresponding car end as the control location for that train, d. another train line circuit path including non-operated position contacts of the control position selector means associated with each car end except the selected control location and connected by loop contactors at the rear of the train to said first and second circuit paths, e. a signal source, at the selected control location on the first car coupled by operated position contacts of the associated control position selector means to said other circuit path for transmitting a braking condition check signal to said first and second circuit paths, f. control and indication means on each car coupled to said first and second circuit paths for receiving said braking condition signal and responsive thereto on said first car for maintaining normal train control operation.

7. A braking condition registry arrangment as defined in claim 6 in which, a. said control and indication means on each car comprises a first and a second register relay and a first and a second indicator at each end control location, b. said first and second relays coupled for separately responding to check signals received over said first or said second circuit path, respectively, c. said first indicators controlled by the associated first relay for displaying a brakes OFF indication when that relay responds to a first circuit path signal, d. said second indicators, except that at said selected control location, controlled by the associated second relay for displaying a brakes ON indication when that relay responds to a second circuit path signal, 1. the second indicator at said selected control location coupled by the corresponding control position selector means to said second circuit path and responsive to a received signal to display a brakes ON indication.

8. A braking condition registry arrangement as defined in claim 7 in which the train is controlled by automatic train operation apparatus and in which said control and indication means further includes, at least on said first car, a. brake assurance control apparatus coupled by the associated control position selector means for receiving the brakes ON signal transmitted through said second circuit path, b. said brake assurance control apparatus coupled to said automatic train operation system and responsive to the reception of a brakes ON signal during a brake application for continuing normal automatic operation, c. said brake assurance control apparatus responsive during a brake application by said automatic operation system, to the absence of a brakes ON signal for actuating a heavier brake application.

9. Braking assurance detection apparatus for use with automatic train operation systems controlling rapid transit trains which may consist of a plurality of coupled cars comprising in combination, a. first, second, and third signaling channels extending the length of the train through the couplers between cars, said first channel connected to said second and third channels at the rear coupler, b. a braking condition detector means on each car controlled by the associated car brake apparatus for operating to at least a first and a second position to detect at least the associated car brakes released and applied, respectively, c. each detector means coupled for completing said second or said third channel on that car as said detector means is operated to its first or second position, respectively, d. a signal source means connected to said first channel at a selected control location for the train for transmitting a detection signal to the rear of that train for return over said second and third channels when complete, and e. brake assurance control apparatus connected to said third channel at said selected control location for receiving said detection signal only when the brakes are applied on all cars, and further coupled for continuing a first braking condition indicated by said automatic train operation system when said brakes applied detection signal is received and for establishing an emergency braking condition if said signal is not received after the first braking condition is initiated.

\* \* \* \* \*